No. 665,121. Patented Jan. 1, 1901.
E. F. MOORE.
WASHING MACHINE.
(Application filed Feb. 27, 1900.)
(No Model.)

Witnesses

Inventor
E. F. Moore,
by his Attorneys

UNITED STATES PATENT OFFICE.

EDWARD F. MOORE, OF ARGENTINE, KANSAS.

WASHING-MACHINE.

SPECIFICATION forming part of Letters Patent No. 665,121, dated January 1, 1901.

Application filed February 27, 1900. Serial No. 6,740. (No model.)

*To all whom it may concern:*

Be it known that I, EDWARD F. MOORE, a citizen of the United States, residing at Argentine, in the county of Wyandotte and State of Kansas, have invented a new and useful Washing-Machine, of which the following is a specification.

My invention relates to washing-machines, and has for its object to produce a machine which will be simple, cheap, and efficient.

With these objects in view my invention consists in the improved construction and combination of parts of a washing-machine, as will be hereinafter more fully set forth.

Figure 1:
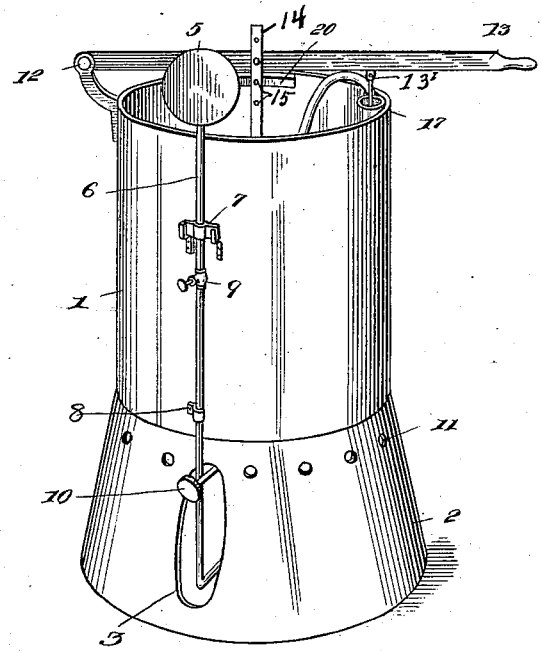
Figure 2:
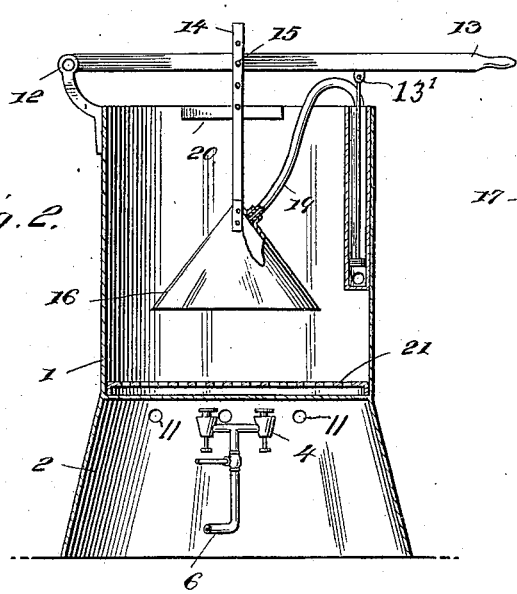
Figure 3:
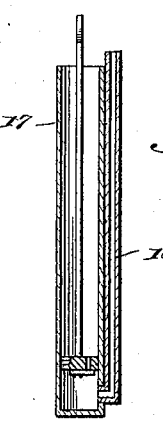

In the accompanying drawings, in which the same reference-numerals indicate corresponding parts in each of the views in which they occur, Figure 1 is a perspective view of my improved washing-machine. Fig. 2 is a vertical sectional view of the same, and Fig. 3 is an enlarged detail view of the air-pump.

In constructing my improved washing-machine to accomplish these very desirable objects I provide a suitable receptacle 1, preferably cylindrical in shape and made from metal. A hollow base 2 may be provided, upon which the receptacle is seated. One side of the base is provided with an opening 3, through which a suitable burner 4 may be inserted in position to keep the water in the receptacle as hot as may be desired during the operation of washing the clothes. The burner may be of any form and is fed from a reservoir 5 through a pipe 6, secured to the side of the receptacle 1 by means of clamps 7 and a loop 8. The pipe is provided with an ordinary valve 9, and the burner is provided with an ordinary regulating-handle 10. The top of the base 2 is preferably provided with a series of air-inlet holes 11 to supply a sufficient quantity of air to the burner.

At the top of one side of the receptacle a bracket 12 is secured in any suitable manner, so as to project slightly above the top of the receptacle, to which is pivotally secured an operating-handle 13, which extends diametrically across the receptacle in position to be moved up and down by the operator. Pivotally secured to the intermediate portion of the handle is a vertical stem 14, which is adjustably secured thereto by means of holes or perforations 15. The lower end of the stem is provided with a suitable cone-shaped plunger 16, which is adapted to be forced down upon the clothes by reciprocating the handle 13. Secured to the side of the receptacle diametrically opposite the bracket 12 is an air-pump 17, the piston of which is detachably connected with the handle 13 by means of a removable pin 13' and is adapted to be moved back and forth within the cylinder of the pump by the operation of the handle. Connected with the lower end of the pump is a tube 18, which extends to the top of the pump, and from which a flexible tube 19 leads to the top of the cone-shaped plunger 16 and communicates with the interior thereof. At one side of the receptacle, between the pump and the bracket, a strip of wood 20 is located of sufficient size to permit of the wringer being secured to the side of the receptacle when desired.

Within the receptacle and resting at a short distance from the bottom is a corrugated and perforated plate 21, through which the dirt from the clothes passes and which also affords a support for keeping the clothes off the bottom directly above the flames of the burner 4.

In operation the receptacle is placed upon the base and provided with the desired quantity of water and the burners lighted and permitted to burn until the water is sufficiently hot to commence the washing, the handle swung upon the bracket 12, so as to remove the plunger from the receptacle, the piston of the air-pump being disconnected from the handle, and the clothes placed in the receptacle in the usual manner. The handle is then returned to its normal position and connected with the piston of the force-pump, when the machine is ready for operation. The operator grasps the free end of the handle 13 and by pressing it downward presses the plunger upon the clothes, which will cause a portion of the air within the plunger to be forced out through the clothes, thereby carrying the dirt from the clothes, which has been loosened by the action of the hot water. At the same time that the plunger is forced downward the piston of the air-pump is forced downward, which will cause additional air to be driven through tubes 18 and 19 into the plunger and out through the clothes. When the handle 13 is elevated, the plunger and piston are raised to the very highest position ready for another downward stroke. As the plunger is raised by the handle, air will enter it through the air-pump and through the tubes 18 and 19, the valve in the pump opening inward and permitting it to pass, thereby avoiding the suction which would otherwise be caused by the expulsion of the air on the downstroke of the handle.

Although I have shown what I consider to be the most convenient and desirable form of apparatus embodying my invention, yet I reserve to myself the right to make such changes and alterations therein as will come within the scope of my invention.

Having thus fully described my invention, what I claim as new, and desire to secure by Letters Patent of the United States, is—

In a washing-machine, the combination, with a receptacle, of a bracket secured to one side of the top of the receptacle, a force-pump upon the opposite side of the receptacle said pump being provided with a tube extending from its bottom to the top, and a handle pivotally secured to the bracket and extending across the top of the receptacle and detachably connected with the piston of the pump, a stem secured to the intermediate portion of the handle, the lower end of which is provided with a cone-shaped plunger and a flexible tube communicating with the top of the first-mentioned tube and with the interior of the plunger, substantially as described.

EDWARD F. MOORE.

Witnesses:
G. L. JENNINGS,
F. F. ERHART.